United States Patent Office

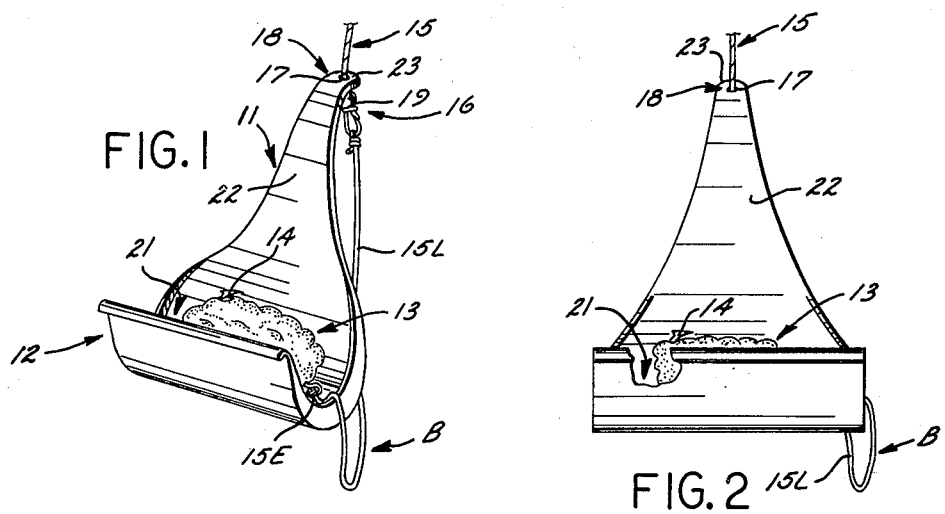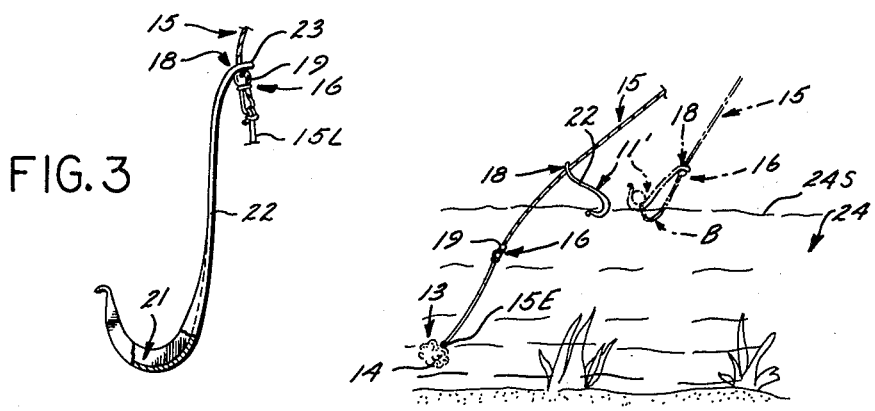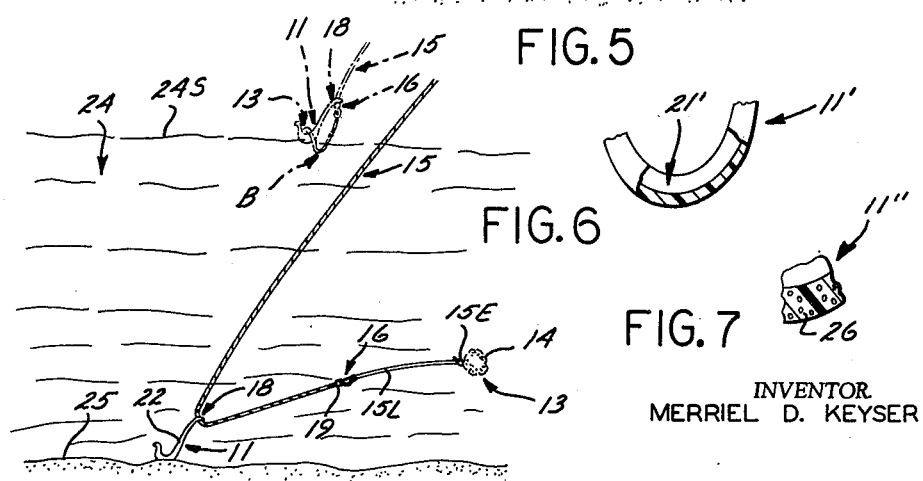

3,195,263
Patented July 20, 1965

3,195,263
CARRIER FOR FACILITATING THE CASTING OF BAIT MEANS
Merriel D. Keyser, 1209 McClellan Way, Stockton 7, Calif.
Filed Jan. 28, 1963, Ser. No. 254,348
2 Claims. (Cl. 43—41.2)

Generally speaking, the present invention relates to the fishing art and, more particularly, to a device for effectively holding and carrying bait means, which throughout this application is intended to be construed as meaning actual bait (such as live bait, cut bait, or the like) or a lure or the like simulating actual bait, which is either carried by fishing hook means, in the case of actual bait, or provided with fishing hook means in the case of a lure or the like, whereby to facilitate casting said bait means and fishing hook means.

It should be noted that the carrier device of the present invention makes it possible to cast the bait means and fishing hook means referred to above much farther than is possible when casting the bait means and fishing hook means without said carrier device in a conventional prior art manner and also permits the use of smaller fishing hook means and/or a longer than average leader portion of the fishing line at the front end thereof which is a very desirable feature for successful fishing for several reasons, among them being the fact that such a leader can be made of a monofilament substantially transparent material which has better wearing characteristics than the conventional fishing line (which is needed since the end portion of a fishing line takes the maximum wear) and since the transparent characteristics thereof may be such as to produce no shadow, which is thought to be desirable in order to prevent frightening a fish who is approaching the bait means in an exploratory manner.

Furthermore, the novel bait means carrier device of the present invention acts to effectively protect the bait means (particularly when it is live bait, cut bait, or the like) from damage and/or distortion by the fishing hook means during a casting operation.

Additionally, it should be noted that the novel bait means carrying device of the present invention is well adapted for use in association with additional weights, sinkers, float means, swivels, or any other conventional fishing line apparatus of this character. It should also be noted that it can be used for casting flies, lures, cut bait, or live bait, and can be used with a fly rod and reel, a spinning rod and reel, and/or a conventional rod and level winding reel.

With the above points in mind, it is an object of the present invention to provide a novel carrier device for facilitating the casting of bait means (and fishing hook means) embodying any or all of the generic and/or various specific aspects thereof briefly mentioned above.

It is a further object of the present invention to provide a novel bait casting device of the character referred to hereinbefore so constructed as to be cooperable with a connection portion of a fishing line spaced from the end thereof in a manner such as to effectively release bait means, fishing hook means, and a leader portion of said fishing line connected thereto (which are carried by the device during a casting operation) after impact with a body of water at the conclusion of a casting operation whereby to completely disengage said bait casting carrier device from said bait means and said fishing hook means in said body of water to provide maximum access to said bait means and fishing hook means by a fish in said body of water.

It is a further object of the present invention to provide a bait casting device of the character referred to in the preceding object wherein said casting device has an effective average density substantially different from that of said body of water whereby to correspondingly determine its net buoyancy characteristic and, therefore, its final vertical location with respect to the surface of said body of water into which it is cast while carrying said bait means and said fishing hook means carried by the leader portion of the fishing line.

It is a further object of the present invention to provide a bait casting device of the character referred to in the preceding object wherein said effective average density of said bait casting device is substantially less than that of said water whereby to cause said bait casting device to float with respect to said body of water upon completion of a casting operation and release of said bait means and said fishing hook means from said casting device.

It is a further object of the present invention to provide a bait casting device of the character referred to in the second preceding object wherein said effective average density of said bait casting device is substantially greater than that of said water whereby to cause it to sink with respect to said body of water upon completion of a casting operation and release of said bait means and said fishing hook means from said casting device.

It is a further object of the present invention to provide a bait carrying and casting device of the character referred to in any of the various generic and/or specific aspects mentioned above and which is of extremely simple, inexpensive, easy-to-manufacture, easy-to-mount with respect to a fishing line, and easy-to-use construction such as to be conducive to widespread use thereof and which has the effect of greatly increasing the effectiveness of bait casting operations.

Further objects are implicit in the detailed description which follows hereinafter (which is to be construed as exemplary of the invention but not specifically limiting it) and said objects will be apparent to persons skilled in the art after a careful study of the detailed description which follows hereinafter.

For the purpose of clarifying the nature of the present invention, two exemplary but non-specifically limiting embodiments are illustrated in the hereinbelow-described figures of the accompanying single drawing sheet.

FIG. 1 is a perspective view of one exemplary embodiment of the invention in mounted relationship with respect to a connection portion of a fishing line and forward leader portion thereof and with said forward leader portion thereof being provided with fishing hook means, shown as mounting bait means and being carried by the holding and casting device of the present invention in a pre-casting position. The rear portion of the fishing line and a fishing pole and reel adapted to carry same are not shown since such are well known in the art and comprise no part of the present invention.

FIG. 2 is a front elevational view of the exemplary embodiment of the invention illustrated in perspective in FIG. 1.

FIG. 3 is a reduced-size side elevational view of FIG. 2 with the forward leader portion of the fishing line, the fishing hook means and the bait means being broken away and with the near wall of the holder means defining the upwardly open recess means being partly broken away— all for reasons of drawing simplification and clarity.

FIG. 4 is a fragmentary operational view drawn to an even smaller scale than FIG. 3 illustrating the form of the invention shown in FIGS. 1–3, in solid or full lines, in the relationship which it would assume at the completion of a casting operation. It is shown in phantom in the immediately preceding position when the device strikes the surface of the water and before the holder means separates from the bait means and the fishing hook means by reason of differential average densities thereof and the consequent differential buoyancy and flotation characteristics thereof, followed by relative slidable movement of the holder means along the fishing line into a position such as exemplified by the solid line showing of FIG. 4. It should be understood that, in the first form of the invention illustrated in FIGS. 1–4, the entire bait carrying and casting device has an effective average density greater than that of the body of water whereby to effectively cause it to sink with respect thereto into the solid line position shown in FIG. 4.

FIG. 5 is an operational view similar to FIG. 4, but illustrates a slightly modified form of the invention wherein the bait holding and casting device has an effective average density less than that of the water such that it ends up in a substantially floating position as shown in solid lines in FIG. 5 after it has tipped over and released the bait means and the fishing hook means. This view also shows in phantom the device when it first strikes the surface of the water during a casting operation and before it has tipped over and released the bait means and the fishing hook means into the relationship shown in solid lines in FIG. 5.

FIG. 6 is an enlarged fragmentary sectional view of a portion of the modified bait carrying and casting device of FIG. 5 illustrating the fact that it is made of a different material having an effective average density less than that of the body of water shown in FIG. 5.

FIG. 7 is an enlarged fragmentary sectional view similar to a portion of FIG. 6, but illustrating a further modification of the material wherein a plurality of cells or voids which may be air-filled, gas-filled or substantial vacuum regions, are dispersed throughout the material whereby to reduce its average density below that of a body of water.

Generally speaking, the bait carrying and casting device of the present invention is designated in one form in FIGS. 1–4 by the reference numeral 11 and is shown in one exemplary but non-specifically-limiting embodiment of the invention wherein it effectively comprises holder means, indicated generally at 12, cooperable to receive, hold and carry bait means, one exemplary form of which is generally indicated at 13 in FIGS. 1, 2 and 4, and also to carry fishing hook means such as indicated at 14 in FIGS. 1, 2 and 4.

In the specific example illustrated, the bait means 13 is shown as a form of cut bait, or the like, mounted on the fishing hook 14. However, it should be clearly noted that the bait means 13 may be of any suitable form and may comprise a fly, cut bait, live bait, or any other animal tissue type of bait, or may comprise what might be called artificial bait, such as various types of lures or the like, and may carry one or more fishing hooks 14, either imbedded therein or projecting therefrom at one or more locations.

In the specific example illustrated, the bait means 13 and the fishing hook means 14 are carried at the remote or forward end of a fishing line, which is indicated generally at 15 and which, in the exemplary but non-specifically-limiting form of the invention illustrated, includes a forward fishing line leader portion 15L extending between a connection portion, indicated generally at 16, and a remote forward end 15E to which the bait means 13 and fishing hook means 14 are attached. However, various other arrangements may be employed within the broad scope and teachings of the present invention.

In the exemplary form illustrated, said forward fishing line leader portion 15L may preferably, although not necessarily, be of a so-called monofilament type which has superior tensile strength, abrasion resistance, and wearing characteristics and which also can readily be made in a transparent form so as to cast no shadow in the water and to, therefore, minimize any possibility of frightening fish which may be approaching the bait means 13 and hook means 14 in an exploratory manner after completion of a casting operation when said bait means 13 and fishing hook means 14 are in a relationship such as is exemplified by the showing of FIG. 4.

In the specific example illustrated, the above-mentioned connection portion of the fishing line 15, which is indicated generally at 16 in the exemplary form of the invention illustrated, may comprise any enlargement or abutment member connecting the fishing line 15 to the forward fishing line leader portion 15L and which is larger than the apertured eye or hole 17 in what may be broadly termed an effective one-way linear movement connection means indicated generally at 18 in said exemplary first form of the invention and which is adapted to allow movement of the entire device 11 along the fishing line 15 away from said connection portion 16 thereof, as is clearly shown by comparing the phantom line and solid line showings of FIG. 5, but which is adapted to positively prevent oppositely directed movement of said bait holding and casting device 11 with respect to said connection portion 16.

In the specific example illustrated, said enlargement or abutment member comprising the connection portion 16 actually takes the form of a swivel connector 19 which swivelly connects the forward fishing line leader portion 15L with respect to the rest of the fishing line 15 and which is larger than the aperture 17 of said effective one-way linear movement connection means, indicated generally at 18, for the purposes described in detail above.

It should also be noted that, in the exemplary form of the invention illustrated, said forward leader portion 15L is substantially longer than the space between the holder means 12 (carrying the bait means 13 and the fishing hook means 14) and said aperture 17 of said effective one-way linear movement connection means indicated generally at 18, thus causing said forward fishing line leader portion 15L to hang in a loop or bight, as is most clearly shown in FIGS. 1 and 2, as indicated at B.

In the specific example illustrated, said holder means, indicated generally at 12, comprises an effectively downwardly recessed and upwardly concave cup-shaped holder means defining a receiving recess 21 therein adapted to receive, hold, and carry said bait means 13 and said fishing hook means 14 as is clearly shown in FIGS. 1 and 2. However, it should be understood that the structure thereof, as shown in FIGS. 1–4, is exemplary only and is not to be construed as specifically limiting the invention thereto since other functionally equivalent arrangements for receiving and holding said bait means 13 and fishing hook means 14 may be employed in lieu thereof within the broad scope and teachings of the present invention.

In the specific example illustrated, the holder means 12 is provided with an upstanding portion 22 extending upwardly above the receiving recess means 21 and having a curved tip portion 23 which carries the apertured eye 17 and which together effectively comprises the hereinbefore generally referred to one-way linear movement connection means, designated generally by the reference numeral 18. However, it should be clearly understood that this structure is exemplary only and is not to be construed as specifically limiting the invention thereto since other functionally equivalent arrangements for providing a spaced one-way linear movement connection means may be employed in lieu thereof within the broad scope and teachings of the present invention.

The operation of the device may be briefly described as follows. The fishing line 15 is adapted to be carried by a fishing rod and reel of any suitable type (not shown since such are well known in the art) and a casting operation is performed in a conventional manner, which will have the effect of casting the entire device 11, bait means 13, fishing hook means 14, and forward fishing line leader portion 15L to a location remote from the fisherman where said assembly of elements will strike the surface 24S of a body of water, indicated generally at 24 in FIG. 4, as shown in phantom in said FIG. 4.

When the above-mentioned assembly of elements strikes said surface 24S of the water 24, the bait holding and casting device 11, the bait means 13 and the fishing hook means 14 will still be in the same fully engaged relationship as shown in FIGS. 1 and 2, as is clearly apparent from examining the reduced-size phantom line showing thereof in FIG. 4. Of course, it should be understood that when the entire bait holding and casting device 11, the bait means 13, and the fishing hook means 14, are cast with considerable force in a forward direction, during at least a portion of the forward movement thereof, the recessed cup-shaped holder means 12 in the portion thereof defining the receiving recess 21 will be substantially forwardly directed because of the greater density and weight thereof as compared to the remainder of the device 11 and also because the upstanding portion 22 is connected to the fishing line 15 by the connection means 18, which produces a rearward drag thereon. However, once the device 11 contacts the surface of the water 24 as shown in FIG. 4 the cup-shaped recess-defining portion thereof, which is the heaviest portion thereof, turns downwardly by reason of the offset location of the center of gravity thereof relative to the substantially lighter upstanding portion 22 which has an upward drag effect as the entire holder drops through the water 24. This is accentuated by reason of the fact that the upstanding portion 22 is also connected by the connection means 18 to the fishing line 15 which tends to float and which actually frictionally resists downward movement through the water 24. These effects all combine to cause the device 11 to drop directly downwardly through the water 24 and to result in separation of the bait means 13 and the fishing hook means 14 from the holder 11 by reason of the differential densities and the consequent differential buoyancy and flotation characteristics thereof so that they may slidably move relative to the device 11 as determined by the amount of fishing line 15 allowed to pass through the aperture 17 of the one-way linear movement connection means indicated generally at 18. This is clearly apparent from examination of the solid line showing of FIG. 4 which also shows the device 12 in a fully sunken position resting upon a bottom surface 25 at the bottom of the body of water 24. This action occurs because of the fact that the entire device 11 is made of a material such as metal or high density plastic or the like having an effective average density substantially greater than that of the water 24 whereby to cause it to sink into a position such as shown in FIG. 4.

FIGS. 5 and 6 illustrate a slight variation of the invention and, because of the great similarity to the first form illustrated in FIGS. 1–4 and described in detail hereinbefore, similar reference numerals are used to indicate similar parts in this modification with the exception of the device 11 itself which is shown with similar numbers, primed, however. This is done because the bait carrying and casting device 11′ in this modification is made of different material from the first form of the invention illustrated in FIGS. 1–4.

The different material of which the holder 11′ of the modified form of the invention illustrated in FIGS. 5 and 6 is made is low density plastic or other material (which, in certain forms, may be of a cellular type in order to further reduce the density thereof, although not specifically so limited) having an effective average density less than the water 24 whereby to cause the entire device 11′ to float with respect to the body of water 24 after tipping and releasing the bait means 13 and the fishing hook means 14 as a result of differential buoyancy and flotation characteristics of the large cup-shaped recess-defining portion of the device 11′ and the upstanding portion 22 thereof as they are acted upon by the body of water 24 after impact of the entire device and the bait means 13 and hook means 14 with said body of water 24 after completion of a casting operation. What happens is that the cup-shaped recess-defining portion of the device 11′ manifests a different degree of buoyancy from the upstanding portion 22 and this, together with the impact effect and the fact that one end of the holder is constrained by the fastening means 18 connected with respect to the fishing line 15 in one direction and is frictionally coupled thereto to some degree in the opposite direction of movement thereof, act together to result in effective tipping of the device 11′ and separation of the bait means 13 and fishing hook means 14 therefrom into a relationship such as is shown in solid lines in FIG. 5.

The initial position of the assembly of elements upon impact with the surface of the body of water is shown in phantom in FIG. 5, while the relationship of said elements after the bait carrying and casting device 11′ has tipped and released the bait means 13 and the fishing hook means 14, is shown in solid or full lines in FIG. 5.

It should be noted that, if desired, in the above-described modification of the invention the fishing line 15 may be provided with additional abutment means or the like adapted to prevent relative sliding movement of the holder means 11′ along said fishing line 15 beyond a certain point. This would then provide an arrangement where the floating device 11′ would actually function as a float adapted to determine the maximum depth of location of the bait means 13 and fishing hook means 14. However, this is an optional arrangement and may be included or not included or modified, as desired.

FIG. 6 merely illustrates, in enlarged fragmentary sectional form, the fact that the modified version of the bait carrying and casting device indicated at 11′ in FIGS. 5 and 6 may be made of a low density plastic material having an effective average density less than that of the body of water 24. However, it may also be of a type having air-filled or gas-filled cells throughout the material, as indicated at 26 in the fragmentary showing of a further modification of the holder device illustrated in FIG. 7 and generally designated by the reference numeral 11″.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A carrier for facilitating the casting of bait means, comprising: holder means having a portion cooperable to receive, hold and carry bait means and fishing hook means effectively connected to the end of a fishing line for facilitating a casting operation, said holder means being provided with effective one-way linear movement connection means cooperable to be effectively connected with respect to and carried by a connection portion of said fishing line at a location spaced from said end of said fishing line, said effective one-way linear movement connection means being spaced from the portion of said holder means adapted to receive, hold and carry said bait means by a distance less than the length of said fishing line between said connection portion thereof and said end thereof, said holder means having an effective average density substantially greater than that of water and greater than that of said bait means whereby to correspondingly determine its net buoyancy characteristic and to cause it to sink with respect to the body of water into which it is cast while carried by said fishing line and to separate from said bait means and said fishing hook means as a result of different effective average densities thereof and the corresponding differential buoyancy and flotation characteristics thereof and to consequently cause relative slidable movement of said one-way connection means relative to said fishing line away from said end and said connection portion thereof.

2. A carrier for facilitating the casting of bait means, comprising: effectively downwardly recessed upwardly concave cup shaped holder means defining a receiving recess means adapted to receive, hold and carry bait means and fishing hook means effectively connected to the end of a fishing line for facilitating a casting operation, said holder means being provided with an upstanding portion extending upwardly above said receiving recess means and being provided with one-way linear movement apertured eye connection means at the top thereof with respect to and carried by a connection portion of said fishing line at a location spaced from said end of said fishing line, said one-way linear movement appertured eye connection means being cooperable with respect to said connection portion of said fishing line for effective firm abutment and attachment relative thereto with respect to the slidable exertion of force thereagainst relative to said fishing line in a direction toward said end thereof, and being freely slidable with respect to said fishing line in the opposite direction, said one-way linear movement apertured eye connection means being spaced from the recess means of said holder means by a distance less than the length of said fishing line between said connection portion thereof and said end thereof, said holder means having an effective average density substantially greater than that of water and greater than that of said bait means whereby to correspondingly determine its net buoyancy characteristic and to cause it to sink with respect to the body of water into which it is cast while carried by said fishing line and to separate from said bait means and said fishing hook means as a result of different effective average densities thereof and the corresponding differential buoyancy and flotation characteristics thereof and to consequently cause relative slidable movement of said one-way connection means relative to said fishing line away from said end and said connection portion thereof.

References Cited by the Examiner
UNITED STATES PATENTS

| | | | |
|---|---|---|---|
| 1,128,205 | 2/15 | White | 43—41.2 |
| 2,554,318 | 5/51 | Wardrip et al. | 43—41.2 |
| 2,914,883 | 12/59 | Kustusch | 43—41.2 |
| 3,083,492 | 4/63 | Kling | 43—44.99 X |

FOREIGN PATENTS 1,041,466   5/53   France.

SAMUEL KOREN, *Primary Examiner.*